US012140769B2

(12) United States Patent
Yuan

(10) Patent No.: US 12,140,769 B2
(45) Date of Patent: Nov. 12, 2024

(54) METHOD FOR ADJUSTING STRAP OF VR DEVICE

(71) Applicant: AAC Acoustic Technologies (Shanghai) Co., Ltd., Shanghai (CN)

(72) Inventor: Junhao Yuan, Shanghai (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 0 days.

(21) Appl. No.: 18/337,420

(22) Filed: Jun. 19, 2023

(65) Prior Publication Data

US 2024/0142782 A1 May 2, 2024

Related U.S. Application Data

(63) Continuation of application No. PCT/CN2022/143325, filed on Dec. 29, 2022.

(51) Int. Cl.
*G09G 5/00* (2006.01)
*G02B 27/01* (2006.01)

(52) U.S. Cl.
CPC .. *G02B 27/0176* (2013.01); *G02B 2027/0154* (2013.01); *G02B 2027/0163* (2013.01)

(58) Field of Classification Search
CPC ........ G02B 27/0176; G02B 2027/0154; G02B 2027/0163

USPC .......................................................... 345/8
See application file for complete search history.

(56) References Cited

U.S. PATENT DOCUMENTS

| 2018/0046147 | A1* | 2/2018 | Aghara | G06F 3/012 |
| 2018/0364754 | A1* | 12/2018 | Sullivan | A45F 5/00 |
| 2019/0324280 | A1* | 10/2019 | Yildiz | G02B 27/0176 |
| 2022/0299782 | A1* | 9/2022 | Ran | G02B 27/0176 |
| 2023/0058052 | A1* | 2/2023 | Al-Ali | A61B 5/02055 |

* cited by examiner

*Primary Examiner* — Jonathan M Blancha
(74) *Attorney, Agent, or Firm* — W&G Law Group

(57) ABSTRACT

A method for adjusting a strap of a VR device is provided and includes a method for tightening the strap. The method for tightening the strap includes obtaining, by tightening trigger, a tightening trigger signal; controlling, by PCB, a driver to drive a transmission component according to the tightening trigger signal to drive first and second straps to be tightened synchronously; obtaining, by pressure sensor, a pressure value of a preset part; and when the pressure value reaches a first preset value, controlling, by PCB, the driver to stop driving the transmission component according to a first pressure sensor signal, such that first and second straps are synchronously tightened to an appropriate position. The method automatically adjusts the tightness of straps, reducing user's operation processes and making it convenient and faster for the user to wear the VR device. The method can ensure moderate tightness for all user head shapes.

7 Claims, 6 Drawing Sheets

METHOD FOR ADJUSTING STRAP OF VR DEVICE

TECHNICAL FIELD

The present disclosure relates to the technical field of virtual reality (VR), in particular to a method for adjusting a strap of a VR device.

BACKGROUND

With the advancement of science and technology, virtual reality (VR) technology is becoming more and more popular among users. VR is a computer simulation system that can create and allow users to experience a virtual world. It can create a simulated environment using a computer, and give the user an immersive feeling in a virtual environment through interactive three-dimension dynamic visual scenes that integrate information from multiple sources and system simulation of entity behaviors.

Currently, VR functionality is mainly implemented by VR devices, such as head-mounted display devices (VR headsets). A VR headset uses a head-mounted display to block the visual and auditory senses of the user from the outside world, and guides the user to experience a feeling of being in a virtual environment. The display principle of the head-mounted display is that the left and right screens display images on the left and right sides, and the eyes of the user captures such different information, which is then combined in the brain to create a sense of depth. In practical applications, VR headsets can be in various device forms, such as a VR box and a VR helmet. Regardless of whether it is a VR box or a VR helmet, the user needs to wear the VR device on the head and tighten the strap to make the VR device fit snugly to the head before starting subsequent operations. However, in the related art, the VR device can be tightened only by manually adjusting the strap after the user wears it. Such VR devices are inconvenient for users to wear quickly, affecting the user experience. Moreover, the strap of each VR device is customized, which takes up project development manpower, material resources, and costs, and is not conducive to standardization.

Therefore, it is necessary to improve the VR device in the related art to solve the above technical problems.

SUMMARY

An objective of the present disclosure is to provide a method for adjusting a strap of a virtual reality (VR) device. The strap adjustment method for the VR device automatically adjusts the tightness of straps, reducing operation processes of a user and making it more convenient and faster for the user to wear the VR device. Moreover, the adjustment method can ensure moderate tightness for all user head shapes.

The present disclosure provides a method for adjusting a strap of a virtual reality (VR) device. The VR device includes a VR main body and a VR strap adjustment mechanism. The VR strap adjustment mechanism includes a first strap and a second strap that are connected to the VR main body, a transmission component, a driver, a tightening trigger, a pressure sensor, and a printed circuit board (PCB) electrically connected to the driver, the tightening trigger, and the pressure sensor. The driver is configured to drive the first strap and the second strap through the transmission component. The method for adjusting the strap includes a method for tightening the strap. The method for tightening the strap includes: obtaining, by the tightening trigger, a tightening trigger signal; controlling, by the PCB, the driver to drive the transmission component based on the tightening trigger signal in such a manner that the first strap and the second strap are driven to be tightened synchronously; obtaining, by the pressure sensor, a pressure value at a preset part; and when the pressure value obtained by the pressure sensor reaches a first preset pressure value, controlling, by the PCB, the driver to stop driving the transmission component based on a first preset pressure value signal obtained by the pressure sensor in such a manner that the first strap and the second strap are synchronously tightened to an appropriate position.

As an improvement, the transmission component includes a worm and a transmission gear, the driver is configured to drive the worm, and the transmission gear is engaged with the worm, the first strap, and the second strap. The controlling, by the PCB, the driver to drive the transmission component based on the tightening trigger signal in such a manner that the first strap and the second strap are driven to be tightened synchronously includes: controlling, by the PCB, the driver to rotate based on the tightening trigger signal; driving, by the driver, the worm to rotate; and driving, by the worm, the transmission gear to rotate in such a manner that the transmission gear drives the first strap and the second strap to be tightened synchronously.

As an improvement, the transmission gear includes a first gear portion and a second gear portion that are coaxially arranged. The first gear portion is engaged with the worm, and the first strap is provided with a first engagement portion configured to be engaged with the second gear portion. The second strap is provided with a second engagement portion configured to be engaged with the second gear portion, and the first engagement portion and the second engagement portion are arranged opposite to each other. The driving, by the worm, the transmission gear to rotate in such a manner that the transmission gear drives the first strap and the second strap to be tightened synchronously includes: driving, by the worm, the first gear portion to rotate; driving, by the first gear portion, the second gear portion to rotate; and driving, by the second gear portion, the first strap and the second strap to be tightened synchronously.

As an improvement, an axis of the worm is perpendicular to an axis of the transmission gear.

As an improvement, a helix angle is formed between a gear tooth of the first gear portion and an axis of the first gear portion, and/or a gear tooth of the second gear portion is parallel to an axis of the second gear portion.

As an improvement, the first engagement portion is a gear tooth formed on of the first strap, and/or the second engagement portion is a gear tooth formed on the second strap.

As an improvement, the first strap is provided with a first slot, and the first engagement portion is provided on a slot wall of the first slot. The second strap is provided with a second slot, and the second engagement portion is provided on a slot wall of the second slot. The second gear portion passes through the first slot and the second slot.

As an improvement, the VR strap adjustment mechanism further includes a loosening trigger electrically connected to the PCB. The method for adjusting the strap of the VR device further includes a method for loosening the strap of the VR device. The method for loosening the strap of the VR device: obtaining, by the loosening trigger, a loosening trigger signal; and controlling, by the PCB, the driver to reversely drive the transmission component based on the loosening trigger signal in such a manner that the first strap and the second strap are driven to be loosened synchronously.

As an improvement, the method for loosening the strap of the VR device further includes: obtaining, by the pressure sensor, a pressure value at a preset part; and when the pressure value obtained by the pressure sensor reaches a second preset pressure value, controlling, by the PCB, the driver to stop reversely driving the transmission component based on a second preset pressure value signal obtained by the pressure sensor in such a manner that the first strap and the second strap stop loosening.

As an improvement, the second preset pressure value is zero.

Compared with the related art, in the method for adjusting the strap of the VR device according to the present disclosure, a trigger signal is first obtained by the tightening trigger, and then the PCB controls the driver to drive the transmission component according to the trigger signal, so as to drive the first strap and the second strap to tighten synchronously. During the tightening process, a pressure sensor is used to obtain a pressure value of a preset part, and when the pressure value obtained by the pressure sensor reaches a preset value, the PCB controls the driver to stop driving the transmission component according to a detection signal of the pressure sensor, such that the first strap and the second strap synchronously tighten to an appropriate position. In this way, the strap adjustment method for the VR device automatically adjusts the tightness of straps, reducing operation processes of a user and making it more convenient and faster for the user to wear the VR device. The adjustment method can ensure moderate tightness for all user head shapes.

BRIEF DESCRIPTION OF DRAWINGS

In order to more clearly illustrate the technical solutions in the embodiment of the present disclosure, the drawings used in the description of the embodiment will be briefly described below. It is obvious that the drawings in the following description are only some embodiments of the present disclosure. For those skilled in the art, other drawings can be obtained according to these drawings without creative efforts, herein.

DETAILED DESCRIPTION OF EMBODIMENTS

Figure 1:
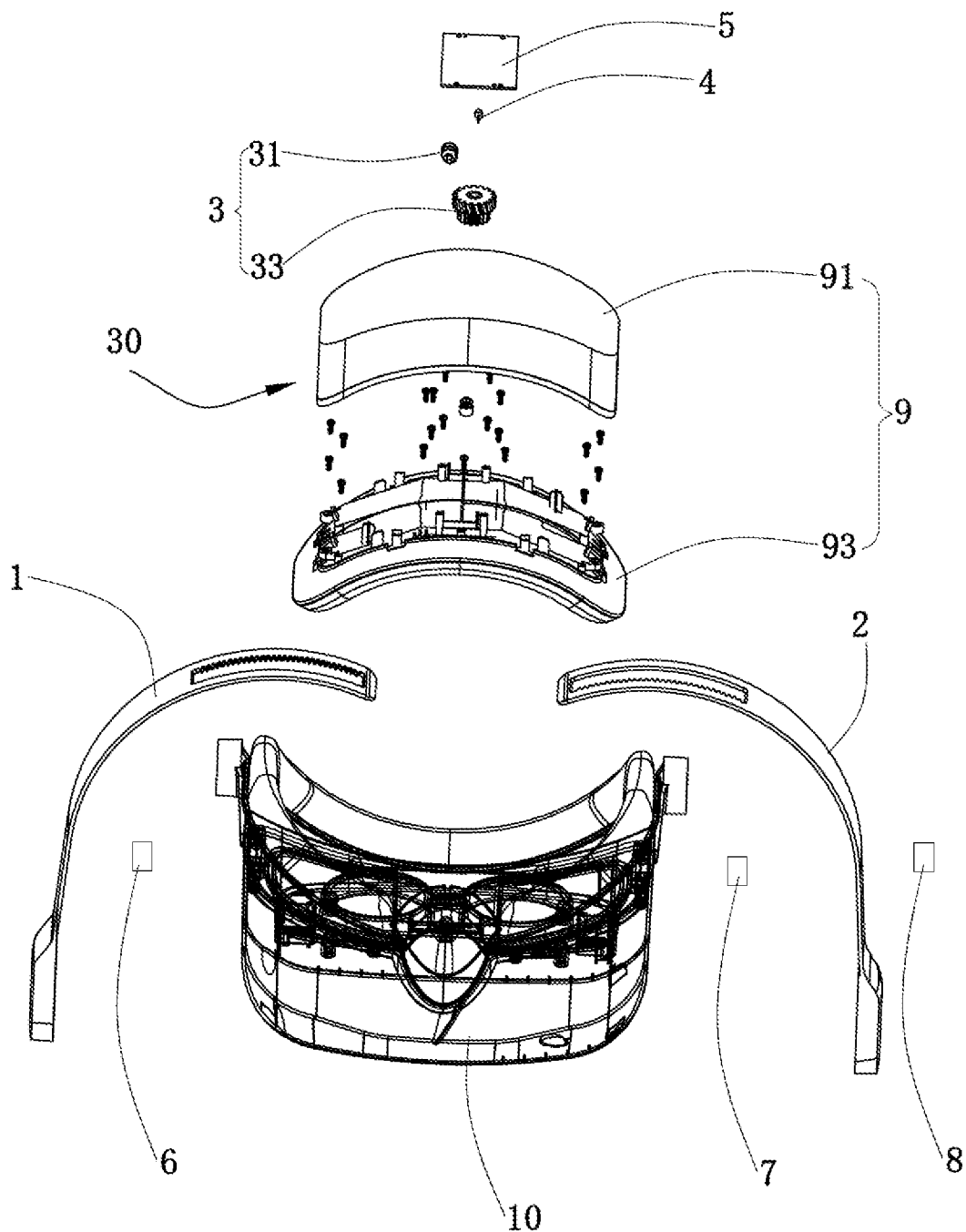
FIG. 1 is an exploded view of a VR device according to the present disclosure.

The technical solutions of the embodiments of the present disclosure are clearly and completely described below with reference to the drawings. Apparently, the described embodiments are merely some rather than all of the embodiments of the present disclosure. All other embodiments obtained by those of ordinary skill in the art based on the embodiments of the present disclosure without creative efforts should fall within the protection scope of the present disclosure. Referring to FIG. 1 to FIG. 4, the VR device provided by the present disclosure is snugly fit on the head of a user by tightening straps, such that the VR device is worn on the head of the user. The VR device can be in various forms, such as a VR box or a VR helmet.

The VR device includes a VR main body 10 and a VR strap adjustment mechanism 30. The VR main body 10 is configured to provide the user a feeling of being in a virtual environment. The VR strap adjustment mechanism 30 is connected to the VR main body 10 and is configured to tighten the straps to achieve a close fit between the VR device and the head of the user.

The VR strap adjustment mechanism 30 includes a first strap 1, a second strap 2, a transmission component 3, and a driver 4. The first strap 1 and the second strap 2 are connected to the VR main body 10. The driver 4 is configured to drive the first strap 1 and the second strap 2 to be tightened and loosened synchronously through the transmission component 3.

The transmission component 3 includes a worm 31 and a transmission gear 33. The driver 4 is configured to drive the worm 31, and the transmission gear 33 includes a first gear portion 35 and a second gear portion 37 that are coaxially arranged. The first gear portion 35 is engaged with the worm 31, and the first strap 1 is provided with a first engagement portion 11 configured to engaged with the second gear portion 37. The second strap 2 is provided with a second engagement portion 21 engaged with the second gear portion 37, and the first engagement portion 11 and the second engagement portion 21 are arranged opposite to each other. An axis of the worm 31 is perpendicular to an axis of the transmission gear 33. When it is necessary to tighten the straps, the driver 4 drives the worm 31 to rotate, and the rotating worm 31 drives the transmission gear 33 to rotate synchronously. During rotation, the transmission gear 33 drives the first strap 1 and the second strap 2 to be tightened synchronously through the force between the second gear portion 37 and the first engagement portion 11 as well as the second engagement portion 21. When it is necessary to loosen the straps, the driver 4 drives the worm 31 to rotate in an opposite direction, and the rotating worm 31 drives the transmission gear 33 to rotate in the opposite direction synchronously. During rotation, the transmission gear 33 drives the first strap 1 and the second strap 2 to loosen synchronously through the force between the second gear portion 37 and the first engagement portion 11 as well as the second engagement portion 21.

In an embodiment, a helix angle is formed between a gear tooth of the first gear portion 35 and an axis of the first gear portion 35. That is, the engaged transmission between the first gear portion 35 and the worm 31 is achieved through a helical gear, or in other words, the first gear portion 35 is equivalent to a helical gear, and the helix angle of the gear portion 35 is the same as a helix angle of the worm 31.

Figure 2:
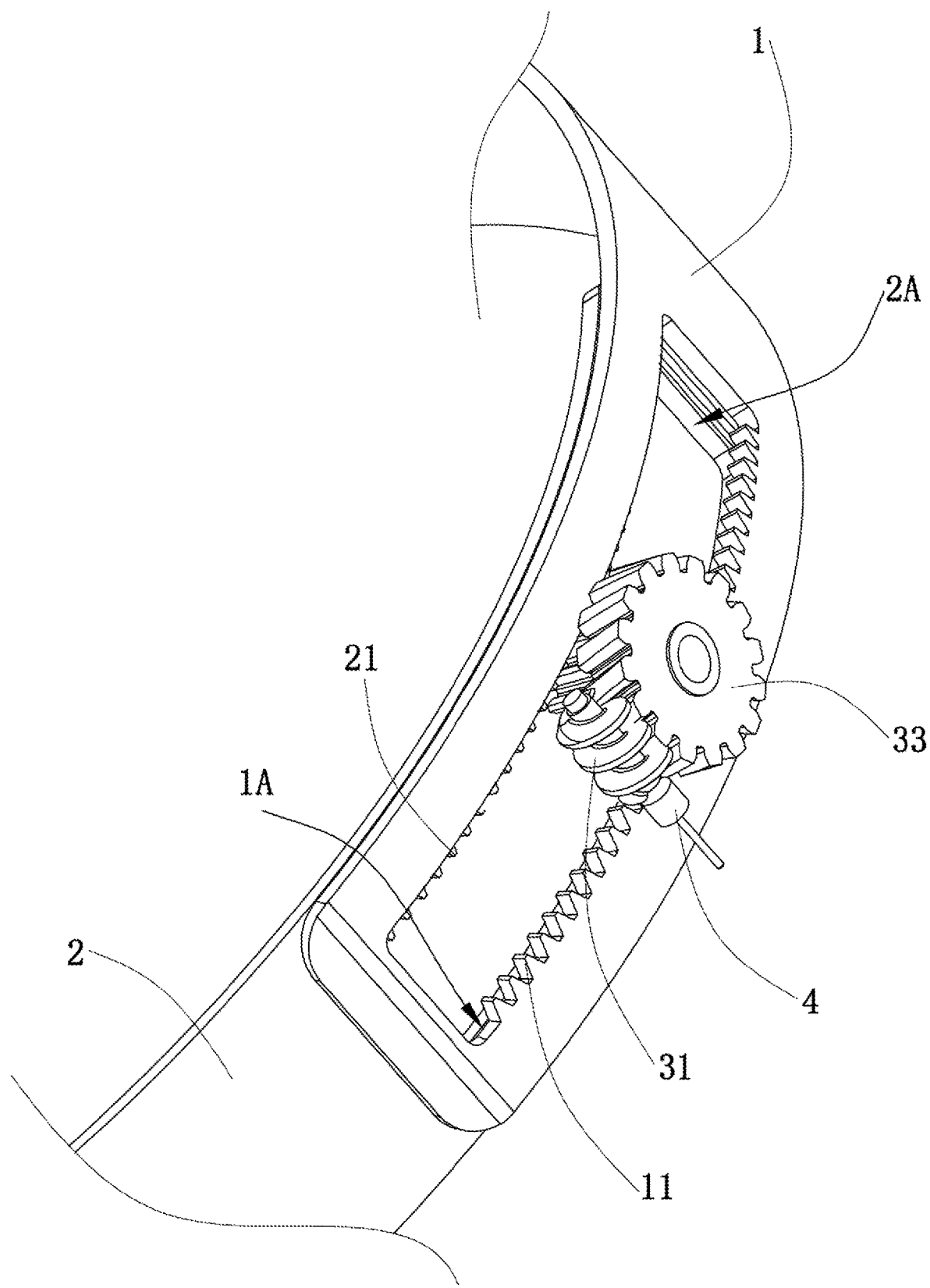
FIG. 2 is a partial schematic structural view of a VR strap adjustment mechanism in a VR device according to the present disclosure.
Figure 3:
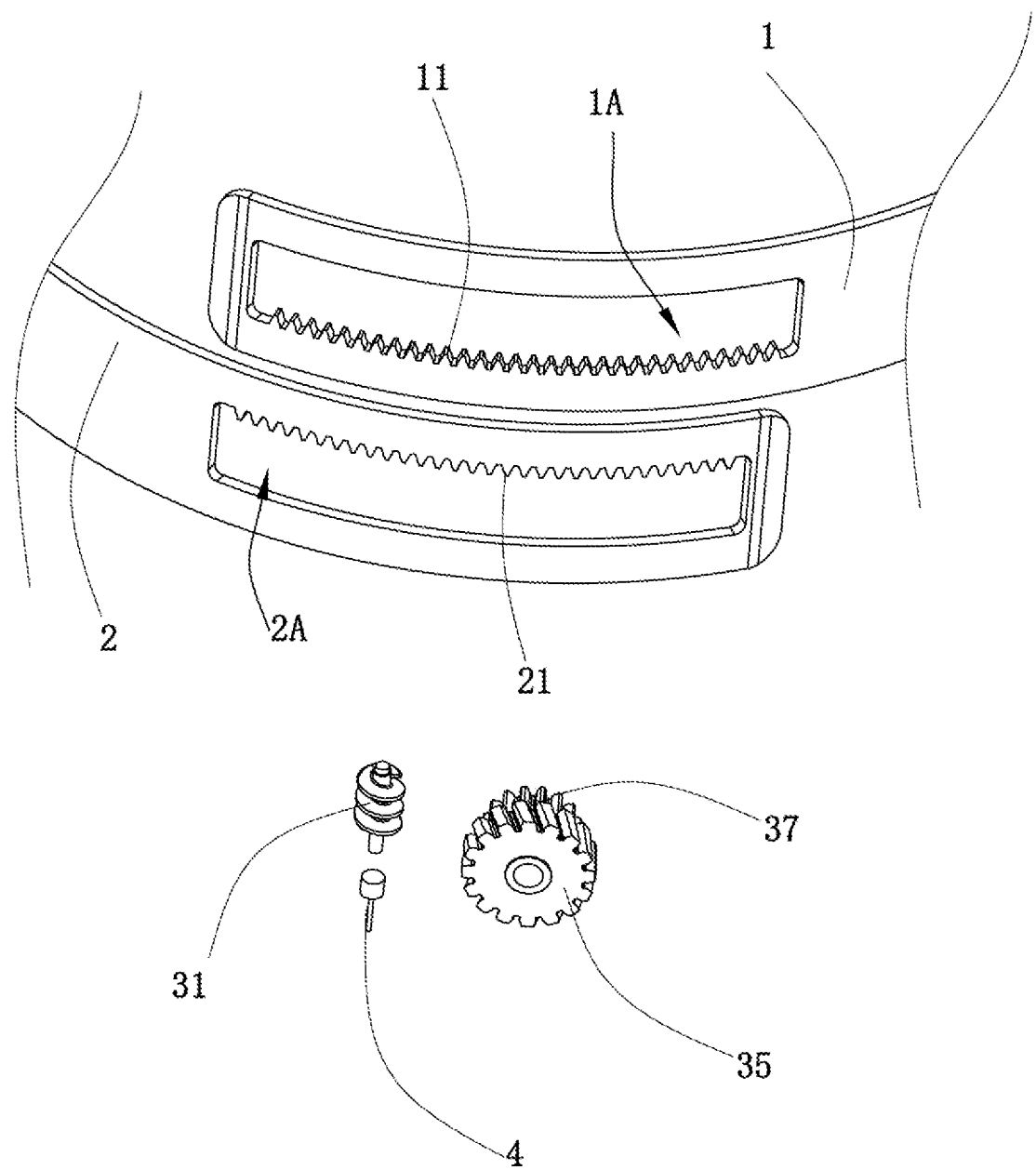
FIG. 3 is an exploded schematic structural view of the VR strap adjustment mechanism shown in FIG. 2.
Figure 4:
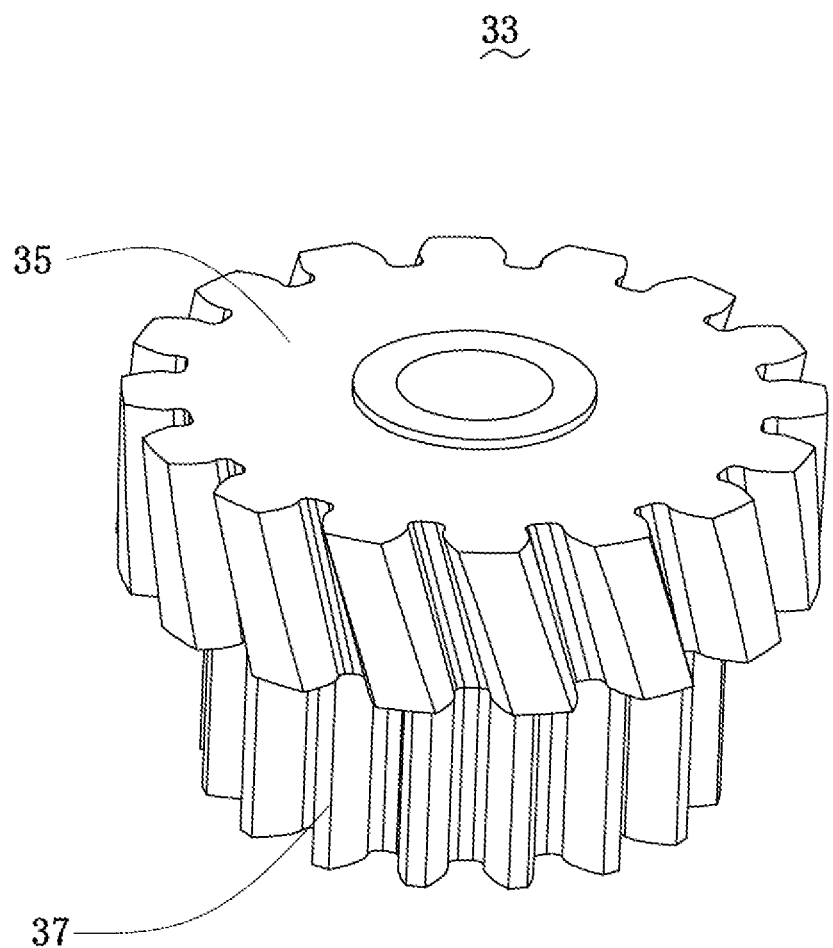
FIG. 4 is a schematic structural view of a transmission gear in the VR device shown in FIG. 1.

As shown in FIG. 2 and FIG. 3, the first engagement portion 11 is a gear tooth formed on the first strap 1, and the second engagement portion 21 is a gear tooth formed on the second strap 2. It can be understood that in other embodiments, the first engagement portion 11 can also be a rack provided on the first strap 1, and/or the second engagement portion 21 can also be a rack provided on the second strap 2.

As shown in FIG. 2 and FIG. 3, the first strap 1 is provided with a first slot 1A, and the first engagement portion 11 is provided on a slot wall of the first slot 1A. The second strap 2 is provided with a second slot 2A, and the second engagement portion 21 is provided on a slot wall of the second slot 2A. The second gear portion 37 passes through the first slot 1A and the second slot 2A.

In an embodiment, a gear tooth of the second gear portion 37 is parallel to an axis of the second gear portion 37. That is, the engaged transmission between the first engagement portion 11 and the second gear portion 37 and the engaged transmission between the second engagement portion 21 and the second gear portion 37 are both achieved through spur gears, or in other words, the second gear portion 37 is equivalent to a spur gear.

The VR strap adjustment mechanism 30 can include a PCB 5, and the driver 4 is electrically connected to a power source through the PCB 5. The PCB 5 can be a main PCB disposed inside the VR main body 10, and the driver 4 is connected to the PCB 5 through a wire/FPC. In another embodiment, the PCB 5 may be independent from the main PCB inside the VR main body 10, and the driver 4 may be assembled on the PCB 5 through the surface mounting technology. The power source may be an external power source, or a battery power source disposed inside the VR main body 10.

The VR strap adjustment mechanism can include a tightening trigger 6 and a pressure sensor 7. The tightening trigger 6 is configured to obtain a tightening trigger signal. The PCB 5 is electrically connected to the tightening trigger 6 and is configured to control the driver 4 to drive the transmission component 3 according to the tightening trigger signal obtained by the tightening trigger 6, so as to drive the first strap 1 and the second strap 2 to be tightened synchronously.

The pressure sensor 7 is configured to obtain a pressure value of a preset part. The PCB 5 is electrically connected to the pressure sensor 7 and is configured to control the driver 4 to stop driving the transmission component 3 according to a first preset pressure value signal obtained by the pressure sensor 7, such that the first strap 1 and the second strap 2 are synchronously tightened to an appropriate position.

It can be understood that the preset part refers to a contact position between the head of the user and the pressure sensor 7 during the tightening process of the first strap 1 and the second strap 2; being synchronously tightened to the appropriate position refers to tightening the first strap 1 and the second strap 2 to a position where an appropriate grip force is maintained for the user, and the magnitude of the grip force is determined by the first preset pressure value; the appropriate grip force means that the first strap 1 and the second strap 2 do not exert too much pressure on the user to make the user feel uncomfortable, while ensuring that the VR device is stably worn on the head of the user. In this way, for different user groups, the VR strap adjustment mechanism can ensure moderate tightness for all user head sizes, thereby improving the user experience.

The tightening trigger 6 may be installed on one of the VR main body 10, the first strap 1, and the second strap 2. The pressure sensor 7 may be installed on one of the VR main body 10, the first strap 1, and the second strap 2. The tightening trigger 6 and the pressure sensor 7 may be connected to the PCB 5 through wires/FPC.

In an embodiment, the tightening trigger 6 is a head sensor configured to detect a size of a user head. It can be understood that in other embodiments, the tightening trigger 6 may be a control switch.

The VR strap adjustment mechanism can include a loosening trigger 8. The loosening trigger 8 is configured to obtain a loosening trigger signal. The PCB 5 is electrically connected to the loosening trigger 8 and is configured to control the driver 4 to drive the transmission component 3 according to the loosening trigger signal obtained by the loosening trigger 8, so as to drive the first strap 1 and the second strap 2 to be loosened synchronously. In this way, the PCB 5 controls the driver 4 to drive the transmission component 3 based on the tightening trigger 6, the pressure sensor 7, and the loosening trigger 8, so as to drive the first strap 1 and the second strap 2 to be tightened and loosened synchronously, thereby achieving the automatic control of strap adjustment.

The loosening trigger 8 may be installed on one of the VR main body 10, the first strap 1, and the second strap 2. The loosening trigger 8 may be a control switch or a sensor, and may be connected to the PCB 5 through wires/FPC.

In an embodiment, the pressure sensor 7 is configured to obtain a pressure value during the synchronous loosening process of the first strap 1 and the second strap 2, and when the pressure value obtained by the pressure sensor 7 reaches a second preset pressure value, the PCB 5 is configured to control the driver 4 to stop reversely driving the transmission component 3 according to the signal of the second preset pressure value, such that the first strap 1 and the second strap 2 stop loosening.

In an embodiment, the second preset pressure value satisfies the following conditions: the positions of the first strap 1 and the second strap 2 allow the VR device to be easily removed from the head of the user.

In an embodiment, the second preset pressure value is zero.

The VR strap adjustment mechanism can include an installation box 9. The driver 4, the transmission component 3, the PCB 5, the first engagement portion 11, and the second engagement portion 21 are all disposed in the installation box 9.

As shown in FIG. 1, the installation box 9 includes a first shell 91 and a second shell 93 that is assembled with the first shell 91 to define a housing space.

The present disclosure provides a method for adjusting a strap of a VR device. The method for adjusting the strap of the VR device includes a method for tightening the strap and a method for loosening the strap of the VR device.

Figure 5:
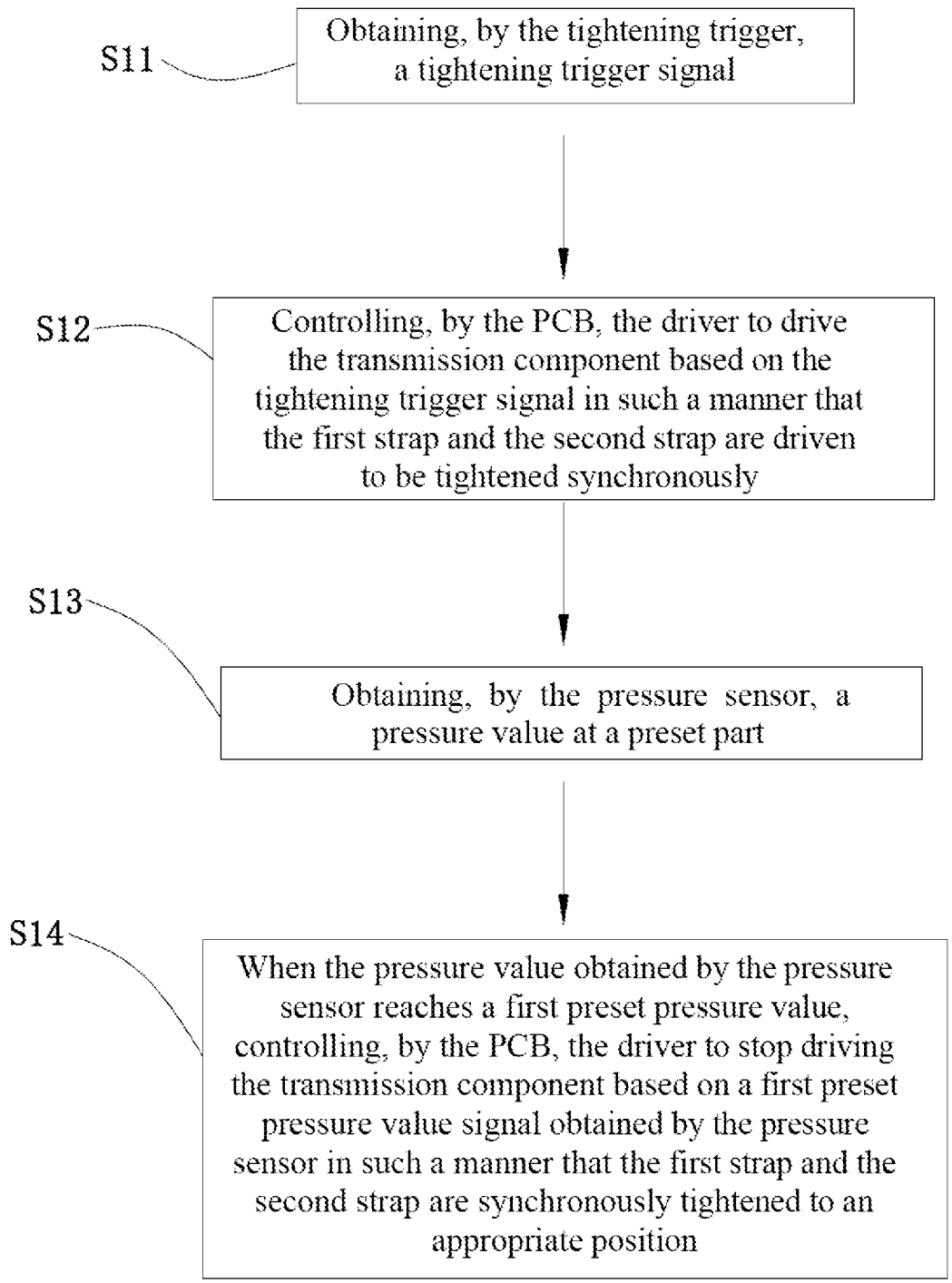
FIG. 5 is a flowchart of a method for adjusting a strap of a VR device according to the present disclosure.

Referring to FIG. 5, the method for tightening the strap includes steps S11, S12, S13, and S14.

At step S11, the tightening trigger obtains a tightening trigger signal. For example, when the tightening trigger 6 is a head sensor, the tightening trigger signal is a size signal of the user head detected by the head sensor.

At step S12, the PCB controls the driver to drive the transmission component according to the tightening trigger signal, so as to drive the first strap and the second strap to be tightened synchronously.

The step of controlling, by the PCB, the driver to drive the transmission component according to the tightening trigger signal, so as to drive the first strap and the second strap to be tightened synchronously includes the following steps:
  controlling, by the PCB the driver to rotate according to the tightening trigger signal;
  driving, by the driver, the worm to rotate; and
  driving, by the worm, the transmission gear to rotate, such that the transmission gear drives the first strap and the second strap to be tightened synchronously.

The step of driving, by the worm, the transmission gear to rotate, such that the transmission gear drives the first strap and the second strap to be tightened synchronously includes:
  driving, by the worm, the first gear portion to rotate;

driving, by the first gear portion, the second gear portion to rotate; and driving, by the second gear portion, the first strap and the second strap to be tightened synchronously.

At step S13, the pressure sensor obtains a pressure value of a preset part.

At step S14, when the pressure value obtained by the pressure sensor reaches a first preset pressure value, the PCB controls the driver to stop driving the transmission component according to a signal of the first preset pressure value obtained by the pressure sensor, such that the first strap and the second strap are synchronously tightened to an appropriate position.

Figure 6:
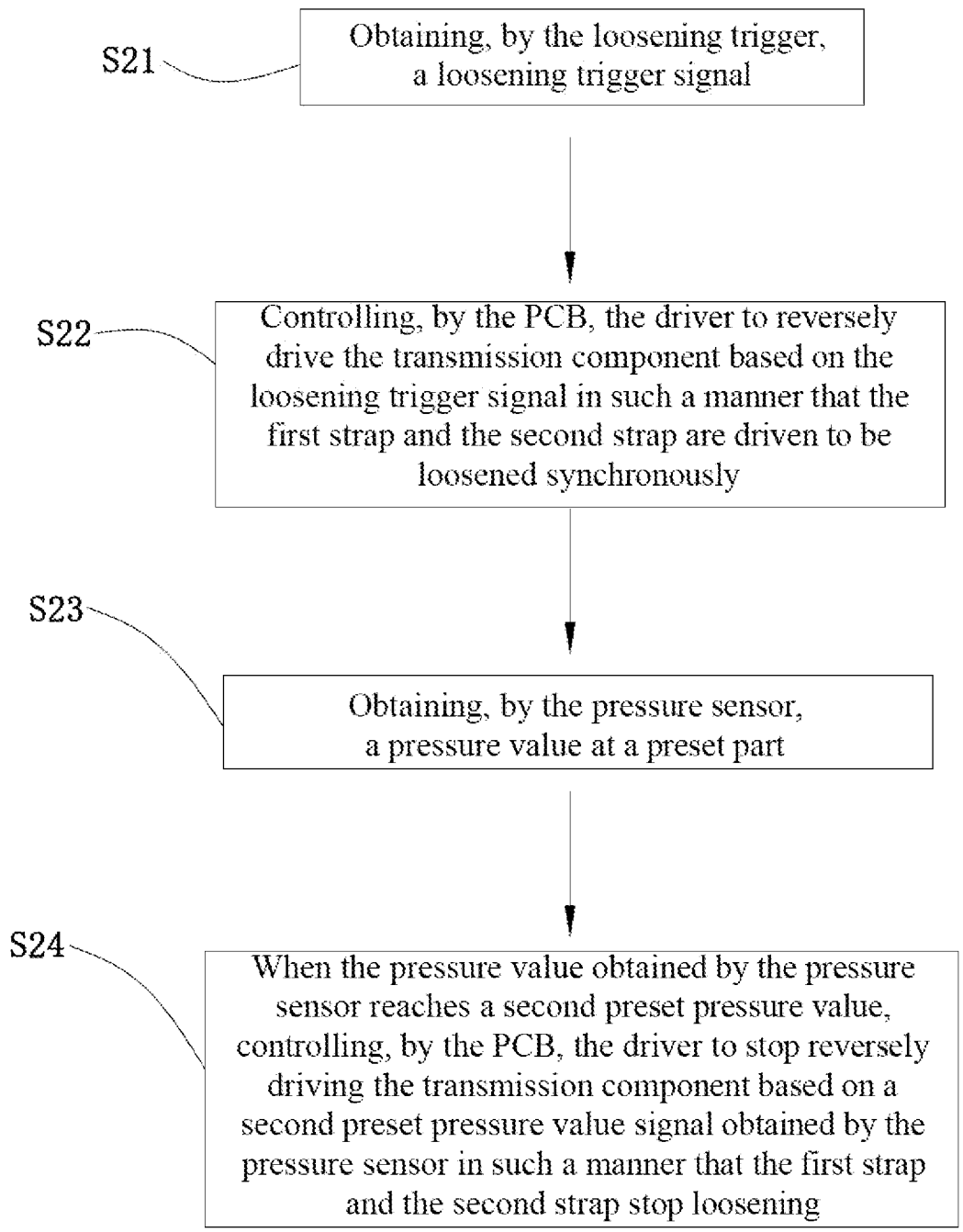
FIG. 6 is a flowchart of a method for adjusting a strap of a VR device according to the present disclosure.

Referring to FIG. 6, the method for adjusting a strap of a VR device includes steps S21, S22, S23, and S24.

At step S21, the loosening trigger obtains a loosening trigger signal.

At step S22, the PCB controls the driver to reversely drive the transmission component according to the loosening trigger signal, so as to drive the first strap and the second strap to be loosened synchronously.

The step of controlling, by the PCB, the driver to reversely drive the transmission component according to the loosening trigger signal, so as to drive the first strap and the second strap to be loosened synchronously includes:

controlling, by the PCB the driver to rotate reversely according to the loosening trigger signal;

driving, by the driver, the worm to rotate reversely; and driving, by the worm, the transmission gear to rotate reversely, such that the transmission gear drives the first strap and the second strap to be loosened synchronously.

The step of driving, by the worm, the transmission gear to rotate reversely, such that the transmission gear drives the first strap and the second strap to be loosened synchronously induces:

driving, by the worm, the first gear portion to rotate reversely;

driving, by the first gear portion, the second gear portion to rotate reversely; and driving, by the second gear portion, the first strap and the second strap to be loosened synchronously.

At step S23, the pressure sensor obtains a pressure value of a preset part.

At step S24, when the pressure value obtained by the pressure sensor reaches a second preset pressure value, the PCB controls the driver to stop reversely driving the transmission component according to a signal of the second preset pressure value, such that the first strap and the second strap stop loosening.

The above described are merely implementations of the present disclosure. It should be noted here that those of ordinary skill in the art may make improvements without departing from the concept of the present disclosure, but such improvements should fall within the protection scope of the present disclosure.

What is claimed is:

1. A method for adjusting a strap of a virtual reality (VR) device, wherein the VR device comprises a VR main body and a VR strap adjustment mechanism, wherein the VR strap adjustment mechanism comprises a first strap and a second strap that are connected to the VR main body, a transmission component, a driver, a tightening trigger, a pressure sensor, a printed circuit board (PCB) electrically connected to the driver, the tightening trigger, and the pressure sensor, and a loosening trigger electrically connected to the PCB, wherein the driver is configured to drive the first strap and the second strap through the transmission component;

wherein the method for adjusting the strap comprises a method for tightening the strap, wherein the method for tightening the strap comprises:

obtaining, by the tightening trigger, a tightening trigger signal;

controlling, by the PCB, the driver to drive the transmission component based on the tightening trigger signal in such a manner that the first strap and the second strap are driven to be tightened synchronously;

obtaining, by the loosening trigger, a loosening trigger signal;

controlling, by the PCB, the driver to reversely drive the transmission component based on the loosening trigger signal in such a manner that the first strap and the second strap are driven to be loosened synchronously;

obtaining, by the pressure sensor, a pressure value at a preset part;

when the pressure value obtained by the pressure sensor reaches a first preset pressure value, controlling, by the PCB, the driver to stop driving the transmission component based on a first preset pressure value signal obtained by the pressure sensor in such a manner that the first strap and the second strap are synchronously tightened to an appropriate position; and a second preset pressure value is zero, when the pressure value obtained by the pressure sensor reaches the second preset pressure value, controlling, by the PCB, the driver to stop reversely driving the transmission component based on a second preset pressure value signal obtained by the pressure sensor in such a manner that the first strap and the second strap stop loosening.

2. The method for adjusting the strap of the VR device as described in claim 1, wherein the transmission component comprises a worm and a transmission gear, wherein the driver is configured to drive the worm, and the transmission gear is engaged with the worm, the first strap, and the second strap; and wherein said controlling, by the PCB, the driver to drive the transmission component based on the tightening trigger signal in such a manner that the first strap and the second strap are driven to be tightened synchronously comprises:

controlling, by the PCB, the driver to rotate based on the tightening trigger signal;

driving, by the driver, the worm to rotate; and driving, by the worm, the transmission gear to rotate in such a manner that the transmission gear drives the first strap and the second strap to be tightened synchronously.

3. The method for adjusting the strap of the VR device as described in claim 2, wherein the transmission gear comprises a first gear portion and a second gear portion that are coaxially arranged, wherein the first gear portion is engaged with the worm, and the first strap is provided with a first engagement portion configured to be engaged with the second gear portion; the second strap is provided with a second engagement portion configured to be engaged with the second gear portion, and the first engagement portion and the second engagement portion are arranged opposite to each other; and wherein said driving, by the worm, the transmission gear to rotate in such a manner that the transmission gear drives the first strap and the second strap to be tightened synchronously comprises:

driving, by the worm, the first gear portion to rotate;

driving, by the first gear portion, the second gear portion to rotate; and driving, by the second gear portion, the first strap and the second strap to be tightened synchronously.

4. The method for adjusting the strap of the VR device as described in claim 3, wherein an axis of the worm is perpendicular to an axis of the gear transmission gear.

5. The method for adjusting the strap of the VR device as described in claim 3, wherein a helix angle is formed between a gear tooth of the first gear portion and an axis of the first gear portion, and/or a gear tooth of the second gear portion is parallel to an axis of the second gear portion.

6. The method for adjusting the strap of the VR device as described in claim 3, wherein the first engagement portion is a gear tooth formed on the first strap, and/or the second engagement portion is a gear tooth formed on the second strap.

7. The method for adjusting the strap of the VR device as described in claim 3, wherein the first strap is provided with a first slot, and the first engagement portion is provided on a slot wall of the first slot; the second strap is provided with a second slot, and the second engagement portion is provided on a slot wall of the second slot; and the second gear portion passes through the first slot and the second slot.

\* \* \* \* \*